United States Patent [19]

Watabe

[11] Patent Number: 4,583,684

[45] Date of Patent: Apr. 22, 1986

[54] METHOD FOR CONTROLLING A TEMPERATURE

[75] Inventor: Shin Watabe, Aichi, Japan

[73] Assignee: Mitsubishi Jukogyo Kabushiki Kaisha, Tokyo, Japan

[21] Appl. No.: 640,231

[22] Filed: Aug. 13, 1984

Related U.S. Application Data

[63] Continuation-in-part of Ser. No. 627,908, Jul. 5, 1984, abandoned.

[30] Foreign Application Priority Data

Jul. 4, 1983 [JP]  Japan ............................... 58-120299

[51] Int. Cl.⁴ ............................................ G05D 15/00
[52] U.S. Cl. .................................... 236/78 D; 165/26
[58] Field of Search ............. 236/78 D, 1 EA, 1 ER; 165/2 G, 12; 62/196.4, 175, 228.4

[56] References Cited

U.S. PATENT DOCUMENTS

| | | |
|---|---|---|
| 3,973,618 | 8/1976 | Naley et al. . |
| 4,256,951 | 3/1981 | Payne et al. ................ 219/508 X |
| 4,320,285 | 3/1982 | Koether ...................... 219/508 X |
| 4,373,663 | 2/1983 | Hammer ........................ 236/78 D |
| 4,379,483 | 4/1983 | Farley ............................... 62/175 |

Primary Examiner—William E. Wayner
Attorney, Agent, or Firm—Wenderoth, Lind & Ponack

[57] ABSTRACT

A method for controlling a temperature of an object to be cooled or heated by a cooling/heating apparatus is improved in that a controllable temperature range of the object is divided into three or more sections and in the respective temperature sections, the temperature of the object is controlled through methods suitable for the respective temperature sections.

6 Claims, 3 Drawing Figures

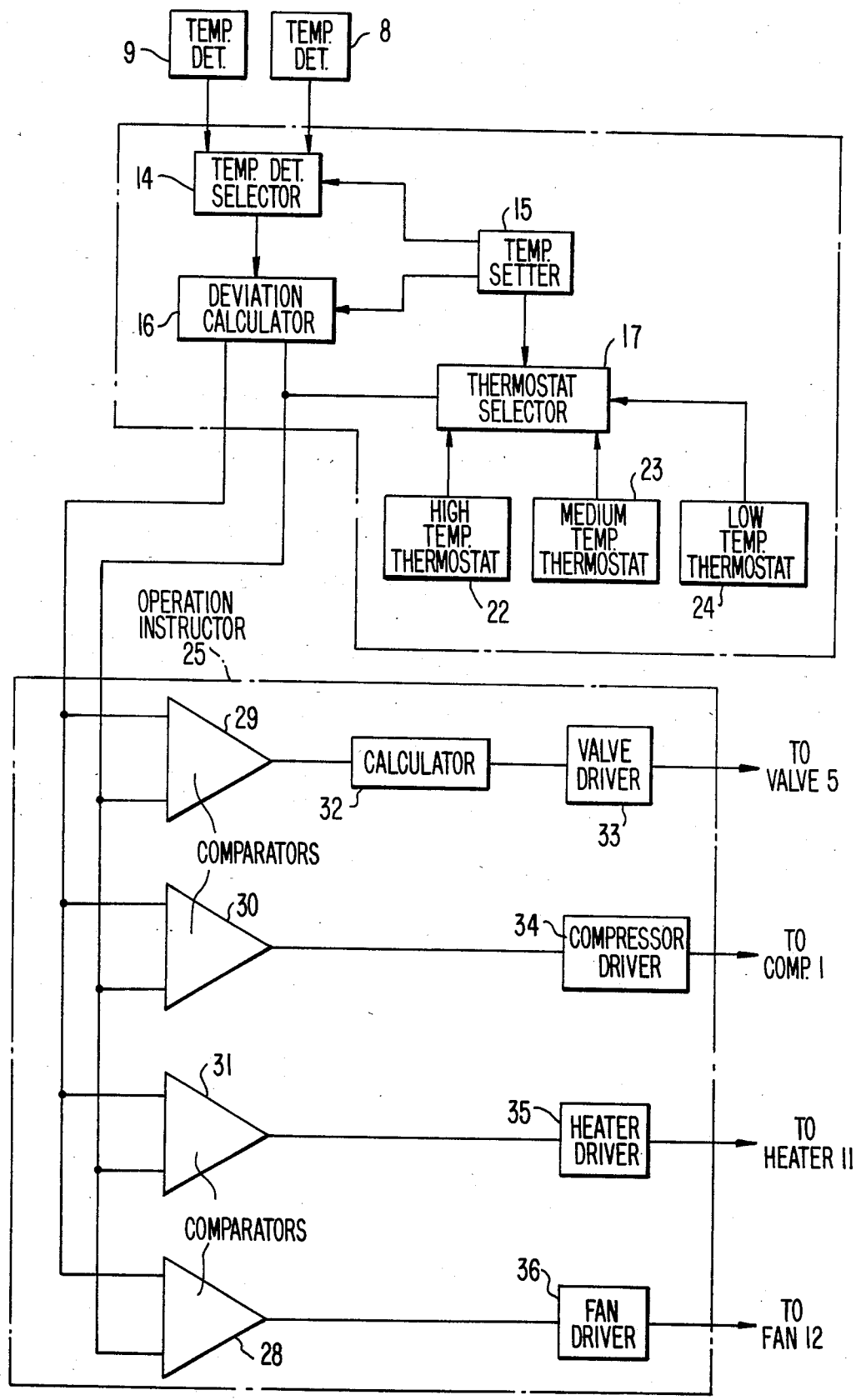

METHOD FOR CONTROLLING A TEMPERATURE

This application is a continuation-in-part of now abandoned application Ser. No. 627,908, filed July 5, 1984, now abandoned.

BACKGROUND OF THE INVENTION

The present invention relates to a method for controlling a temperature, and more particularly, to a temperature control method that is suitable for controlling a temperature of air within a chamber called "freezing container" in which articles to be transported are accommodated.

One example of a temperature control method in a freezing container in the prior art will be explained with reference to FIG. 1. In this figure, reference numeral (10) designates a chamber in which articles to be transported are accommodated, and in this chamber, air is circulated through an evaporator (4) and a heater (11), as indicated by blanked bold arrows in the figure, by driving a fan (12). Reference numeral (1) designates a refrigerant compressor, and a refrigerant gas at a high temperature and at a high pressure discharged from this refrigerant compressor (1) enters a condenser (2) in which the refrigerant is cooled and condensed into liquid; subsequently, the refrigerant enters a restrictor (3) in which it expands adiabatically, and then it enters the evaporator (4), in which the refrigerant cools the air circulating within the chamber (10), while it is in itself heated and evaporates into a gaseous state and returns to the compressor (1). During operation of the compressor (1), by opening a valve (5), a part of the refrigerant gas at a high temperature and at a high pressure discharged from the compressor (1) by-passes the condenser (2) and the restrictor (3) and enters the evaporator (4) without radiating heat, hence a cooling capacity of the evaporator (4) can be reduced, and the cooling capacity can be controlled in a stepless manner by regulating a degree of opening of the valve (5). Reference numeral (8) designates a temperature detector for detecting a temperature of a return air (6), numeral (9) designates a temperature detector for detecting a temperature of a blow-out air (7) which has been cooled or heated by passing through the evaporator (4) and the heater (11), and numeral (14) designates temperature detector selecting means, which selects the use of the temperature of the blow-out air (7) detected by the temperature detector (9) in response to a signal applied thereto from temperature setting means (15) when a set temperature arbitrarily preset in the temperature setting means (15) correspnds to a cold storage condition, but which selects the use of the temperature of the return air (6) detected by the temperature detector (8) in response to a signal applied thereto from the temperature setting means (15) when the set temperature arbitrarily preset in the temperature setting means (15) corresponds to a freezing condition. Reference numeral (16) designates a deviation calculator, which compares the detection temperature selected by the temperature detector selecting means (14) with the set temperature preset in the temperature setting means (15), and calculates a deviation therebetween, and outputs the deviation to an operation instructor (20). Reference numeral (17) designates thermostat selecting means, which selects a cold storage thermostat (18) in response to a signal applied from the temperature setting means (15) when the set temperature preset in the temperature setting means (15) corresponds to a cold storage condition, but which selects a freezing thermostat (19) in response to a signal applied from the temperature setting means (15) when the set temperature preset in the temperature setting means (15) coresponds to a freezing condition. In the operation instructor (20), the deviation input thereto from the deviation calculator (16) and a deviation preset in the thermostat (18) or (19) which is also input thereto from the thermostat selecting means (17) are compared, and the operation instructor (20) issues instructions for operating the compressor (1), the valve (5), the heater (11) and the fan (12) under predetermined operation modes according to an operation pattern preset in the thermostat (18) or (19).

In the case where frozen articles are accommodated within the chamber (10) and the temperature of the chamber is to be maintained at a predetermined temperature or lower, for instance, if $-18°$ C. is preset in the temperature setting means (15), then in response to signals issued from the temperature setting means (15), the temperature detector selecting means (14) selects the temperature selector (8) and the thermostat selecting means (17) selects the freezing thermostat (19). In the event that the detection temperature of the return air (6) detected by the temperature detector (8) is higher than the set temperature preset in the temperature setting means (15), that is, higher than $-18°$ C., then a deviation between these temperatures is calculated in the deviation calculator (16) and input to the operation instructor (20), in which the deviation is compared with the deviation preset in the freezing thermostat (19) and if the former deviation is higher than the latter deviation, the refrigerant compressor (1) and the fan (12) are started in response to instructions issued from the operation instructor (20) and hence the air circulating through the chamber (10) is cooled by the evaporator (4). If the air temperature is lowered and the deviation of the detection temperature from the set temperature becomes equal to or lower than the deviation preset in the freezing thermostat (19), then the refrigerant compressor (1) is stopped in response to an instruction issued from the operation instructor (20), and subsequently, by repeating the above-described start and stop of the refrigerant compressor (1), the temperature within the chamber (10) can be maintained at $-18°$ C. which is preset in the temperature setting means (15).

On the other hand, in the case where 0° C., for instance, has been preset in the temperature setting means (15) for the purpose of accommodating cold storage articles within the chamber (10), then the temperature detector selecting means (14) selects the temperature detector (9) and the thermostat selecting means (17) selects the cold storage thermostat (18). In the event that the detection temperature of the blow-out air (7) detected by the temperature detector (9) is higher than the set temperature, that is, 0° C., when the deviation between these temperatures is higher than the deviation preset in the cold storage thermostat (18), in response to instructions issued from the operation instructor (20) the compressor (1) and the fan (12) are driven to cool the air, and as the temperature within the chamber (10) falls, when the deviation of the detection temperature from the set temperature has become equal to or lower than the deviation preset in the cold storage thermostat (18), in response to an instruction issued from the operation instructor (20) the valve (5) is opened to reduce the cooling capacity of the evaporator (4). Thereafter, while the operation of the compressor (1) is continued, the cooling capacity of the evaporator (4) is regulated by regulating a degree of opening of the valve (5) in response to an instruction issued from the operation instructor (20). However, in the event that the thermal load for the chamber (10) has been lowered in excess of a controllable range by means of the valve (5), then a current is passed through the heater (11) in response to an instruction issued from the operation instructor (20), and thereby a balance between the thermal load for the chamber (10) and the cooling capacity of the evaporator (4) can be maintained. In the case where the deviation of the detection temperature from the set temperature is equal to or lower than the deviation preset in the cold storage thermostat (18), the heater (11) and the fan (12) are started without starting the compressor (1), and the circulating air is thereby heated, and at the time point when the temperature within the chamber (10) has risen and the deviation of the detection temperature from the set temperature has reached the deviation preset in the cold storage thermostat (18), the compressor (1) is started.

In the above-described control system in the prior art, the operation of the compressor (1) is always continued during cold storage, and the cooling capacity is decreased or increased in a stepless manner by increasing or decreasing a degree of opening of the valve (5) in a stepless manner, and a high precision temperature control is thereby effected so that the variation range of the temperature of the air within the chamber (10) may be reduced to as small a value as possible. However, in the case of cold storage of industrial products such as films, electric products, etc., the set temperature to be preset in the temperature setting means (15) is in a high temperature region in the proximity of 20° C., and also in this case, a temperature control at a high precision having a very narrow variation range of the temperature within the chamber as is the case where agricultural products such as fruits, chilled beef, etc. are stored under a cold condition at a set temperature in the proximity of 0° C., is unnecessary; and furthermore, since the set temperature is in a high temperature region in the proximity of 20° C., the thermal load is low and hence a period when cooling of the air in the chamber is unnecessary would arise frequently. Therefore, it is wasteful to carry out high precision temperature control while the operation of the compressor (1) is always continued despite of the above-mentioned facts; the power necessitated for the operation of the compressor (1) during this temperature control is wasted, and so, the temperature control system in the prior art had a shortcoming in that its efficiency of energy consumption was very poor.

SUMMARY OF THE INVENTION

It is therefore one object of the present invention to provide an improved method for controlling a temperature of an object to be cooled or heated by a cooling-/heating apparatus, which is free from the shortcomings of the temperature control method in the prior art.

Another object of the present invention is to provide an improved method for controlling an object, in which in the case where industrial products such as films, electric products, etc. are stored under a cold condition, appropriate temperature control fulfilling the requirement in that case is effected, a power loss in this case is reduced, and its efficiency of energy consumption is thereby improved.

According to one feature of the present invention, there is provided a method for controlling a temperature of an object to be cooled or heated by a cooling-/heating apparatus, in which a controllable temperature range of the object is divided into three or more sections and in the respective temperature sections, the temperature of the object is controlled through methods suitable for the respective temperature sections.

Since the present invention has the above-mentioned feature, according to the present invention, when industrial products such as films, electric products, etc., energy-saving control of a temperature that is different from the case of storing agricultural products such as fruits, chilled beef, etc. under a cold condition, can be achieved.

BRIEF DESCRIPTION OF THE DRAWINGS

The above-mentioned and other objects, features and advantages of the present invention will become more apparent by reference to the following description of one preferred embodiment of the invention taken in conjunction with the accompanying drawings, wherein:

FIG. 3 is a block diagram of a temperature control system which operates in accordance with the present invention.

DESCRIPTION OF THE PREFERRED EMBODIMENT

Figure 2:
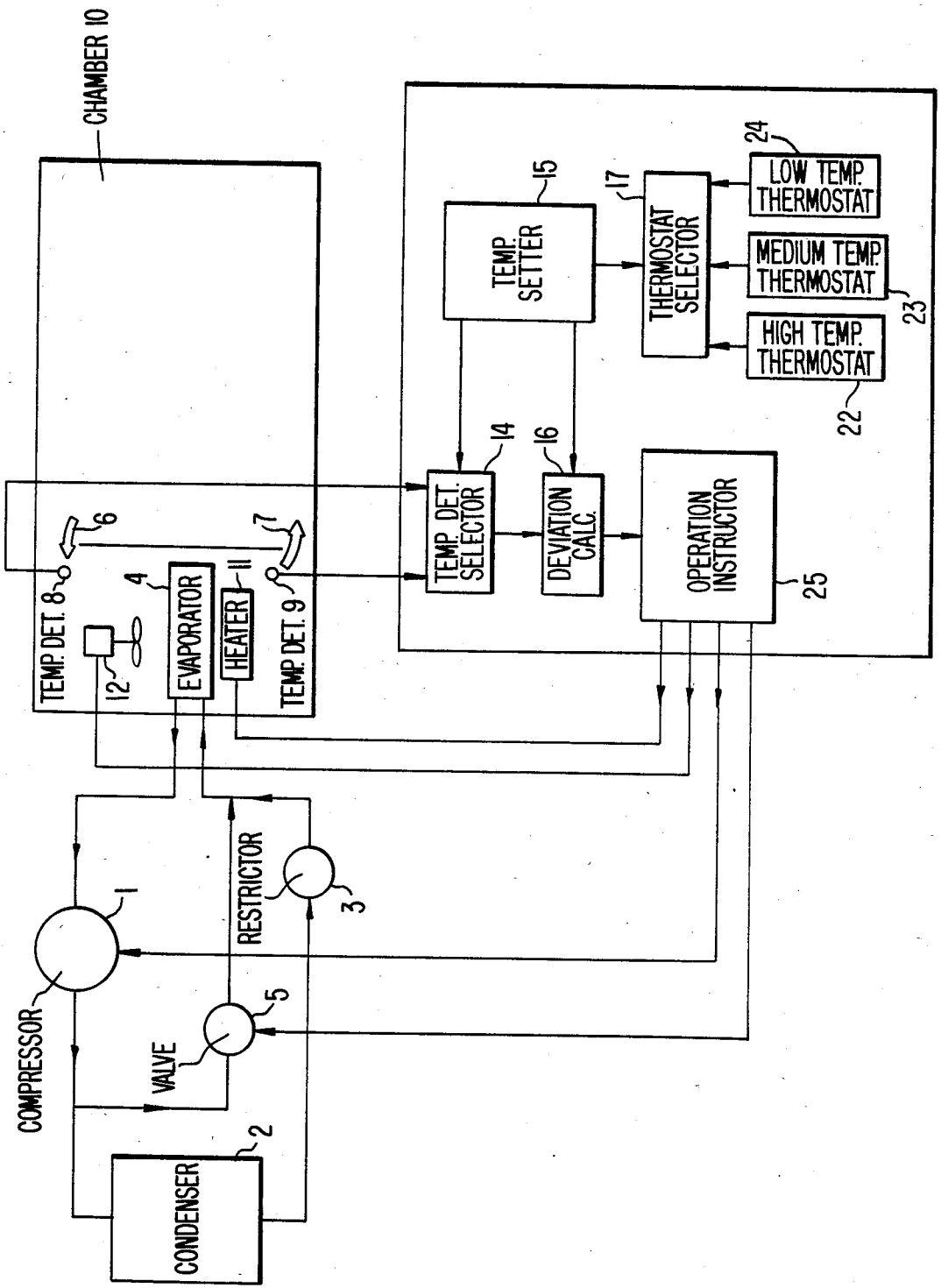
FIG. 2 is a system diagram showing one preferred embodiment of the present invention as applied to a method for controlling a temperature of a freezing container.

Now the present invention will be described in greater detail in connection to one preferred embodiment of the invention illustrated in FIG. 2. In this figure, reference numeral (22) designates a high temperature thermostat, numeral (23) designates a medium temperature thermostat, and numeral (24) designates a low temperature thermostat. When a temperature of 5° C. or higher is preset in temperature setting means (15), in response to a signal applied from the temperature setting means (15) thermostat selecting means (17) selects the high temperature thermostat (22), and at the same time, the detection temperatures of both the temperature detectors (8) and (9) are selected by temperature detector selecting means (14). When a temperature between −3° C. and +5° C. is preset in the temperature setting means (15), in response to a signal applied from the temperature setting means (15) the thermostat selecting means (17) selects the medium temperature thermostat (23), and at the same time, the detection temperature of the temperature detector (9) is selected by the temperature detector selecting means (14). When a temperature of −3° C. or lower is preset in the temperature setting means (15), in response to a signal applied from the temperature setting means (15) the thermostat selecting means (17) selects the low temperature thermostat (24), and at the same time, the detection temperature of the temperature detector (8) is selected by the temperature detector selecting means (14).

Figure 1:
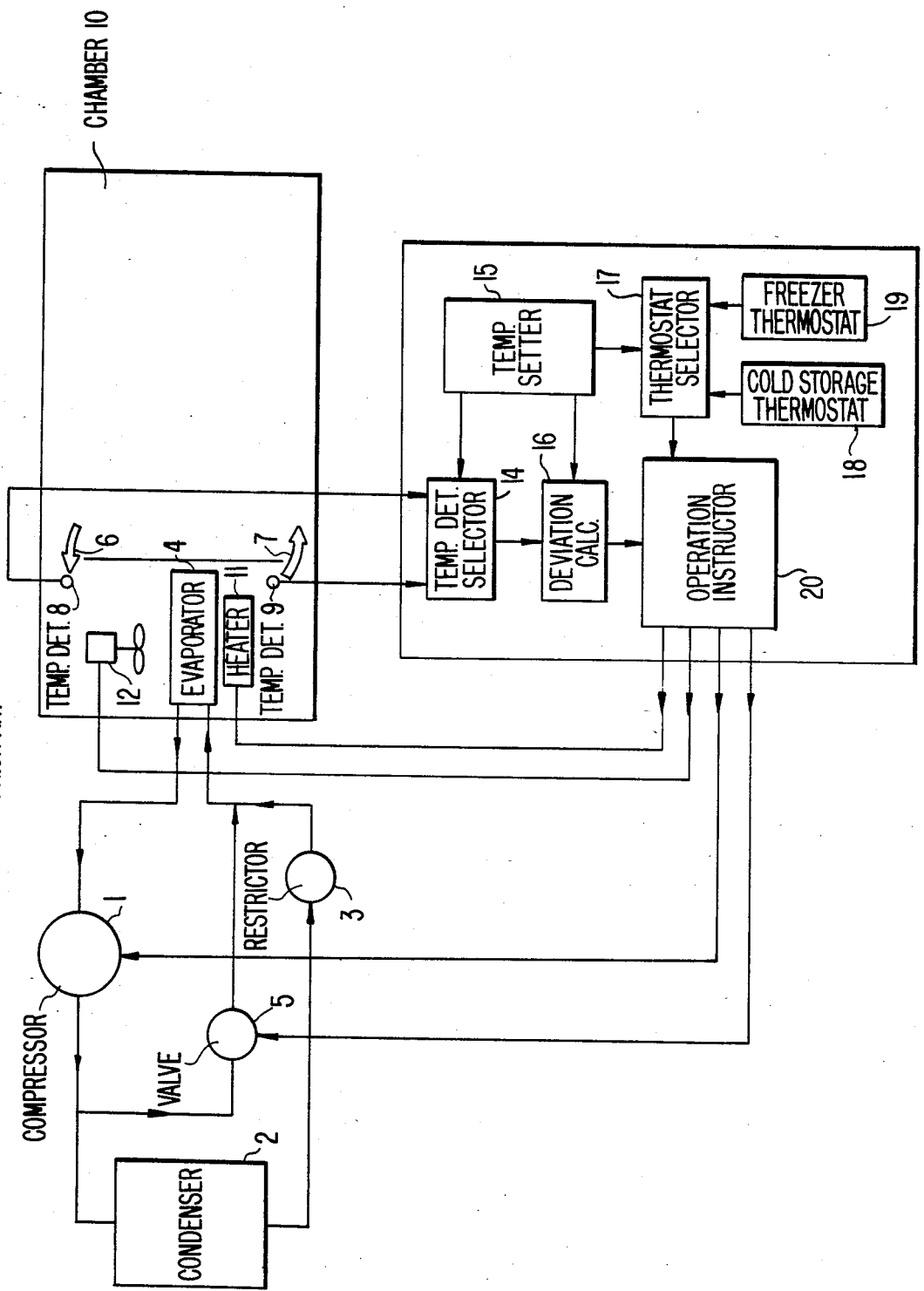
FIG. 1 is a system diagram showing one example of a method for controlling a temperature of a freezing container in the prior art.

Upon storing frozen articles, if a temperature of, for instance, −18° C. is preset in the temperature setting means (15), in response to signals issued from the temperature setting means (15) the low temperature thermostat (24) and the detection temperature of the temperature detector (8) are selected, and similarly to the case of freezing in the temperature control system in the prior art as shown in FIG. 1, the deviation of this selected detection temperature from the set temperature −18° C. is compared with a deviation preset in the low temperature thermostat (24), and by repeating start and stop of the compressor (1), temperature control is effected with a full capacity of a cooling apparatus without regulating a cooling capacity of the cooling apparatus.

Upon storing agricultural articles such as fruits, chilled beef, etc. under a cold condition, if a temperature of, for instance, 0° C. is preset in the temperature setting means (15), in response to signals issued from the temperature setting means (15) the medium temperature thermostat (23) and the detection temperature of the temperature detector (9) are selected, and similarly to the case of cold storage in the temperature control system in the prior art as shown in FIG. 1, when the deviation of the selected detection temperature from the set temperature 0° C. has become lower than a deviation preset in the medium temperature thermostat, a cooling capacity of a cooling apparatus is controlled in a stepless manner by regulating a degree of opening of a valve (5) while an operation of a compressor (1) is continued, and thereby temperature control is effected so that a temperature of a chamber (10) may be maintained within a range of a very narrow temperature variation with in the proximity of the set temperature 0° C.

Upon storing industrial products such as films, electric products, etc. under a cold condition, if a temperature of, for instance, 20° C. is preset in the temperature setting means (15), in response to signals issued from the temperature setting means (15) the temperature detector selecting means (14) selects both the temperature detectors (8) and (9) and the thermostat selecting means (17) selects the high temperature thermostat (22). When the deviation of the detection temperature of the temperature detector (8) from the set temperature 20° C. which is calculated in a deviation calculator (16) exceeds a predetermined deviation that is preset in the high temperature thermostat (22), the compressor (1) starts to operate according to an instruction issued from an operation instructor (25), and so, the air circulating through the chamber (10) is cooled by the evaporator (4), similarly to the above-described temperature control system in the prior art. If the deviation of the detection temperature of the temperature detector (8) from the set temperature 20° C. is lowered to a predetermined deviation that is preset in the high temperature thermostat (22) as a result of the abovementioned cooling effect, the operation instructor (25) instructs the valve (5) to open, and the cooling capacity is thereby reduced. A degree of opening of the valve (5) is subjected to proportional control as instructed by the operation instructor (25) so that the difference between the detection temperature of the temperature detector (9) and the detection temperature of the temperature detector (8) which is calculated by the deviation calculator (16) may take a predetermined value. In this way, an operation at a predetermined reduced cooling capacity is effected regardless of whether the thermal load is large or small, and therefore, the temperature of the chamber (10) is further lowered. As a result, when the deviation of the detection temperature of the temperature detector (8) from the set temperature 20° C. becomes a value preset in the high temperature thermostat (22), for instance, becomes zero, the operation instructor (25) instructs to stop the operation of the compressor (1) and also instructs the valve (5) to close. During this stop period of the compressor (1), if the temperature of the chamber (10) rises due to a power for operating the fan (12), invasion of heat into the chamber (10) from the outside, or the like and the deviation of the detection temperature of the temperature detector (8) from the set temperature 20° C. exceeds the deviation preset in the high temperature thermostat (22), then the operation instructor (25) instructs the compressor (1) to start operation again and also instructs the valve (5) to open, and so, a cooling operation at a predetermined reduced cooling capacity is recommenced. By repeating the above-described operations, the temperature of the chamber (10) can be maintained nearly constant. On the other hand, when the temperature of the chamber (10) is further lowered despite of the fact that the compressor (1) is kept stopped as is the case where the ambient air temperature is lowered, if the deviation of the detection temperature of the temperature detector (8) from the set temperature 20° C. is lowered beyond a negative deviation preset in the high temperature thermostat (22) and becomes more negative than the set negative deviation, then current feed to a heater (11) is commenced and a heating operation is effected by passing a current through the heater (11) and operating the fan (12). As a result of this heating operation, if the deviation of the detection temperature of the temperature detector (8) from the set temperature 20° C. exceeds a predetermined deviation preset in the high temperature thermostat (22), then the current feed to the heater (11) is stopped. As a result of the above-described operations, the temperature of the chamber (10) can be maintained nearly at a constant temperature.

In summary, in the above-described embodiment of the present invention, a temperature control range of the chamber (10) is divided into three sections consisting of a high temperature region, a medium temperature region and a low temperature region; in the low temperature region, the temperature of the chamber (10) is controlled by repeating operation and stop of the compressor (1) so as to maintain the temperature of the return air constant without regulating a degree of opening of the valve (5), in the medium temperature region, high precision temperature control is effected so as to maintain the temperature of the chamber (10) within a very narrow temperature variation width in the proximity of a target temperature by regulating a degree of opening of the valve (5) in a stepless manner while continuing the operation of the compressor (5) so that the temperature of the blow-out air may be maintained constant; and, in the high temperature region, energy-saving temperature control can be effected by repeating operation and stop of the compressor (1) and controlling the degree of opening of the valve (5) so that the difference between the temperature of the blow-out air and the temperature of the return air may be maintained constant regardless of whether the thermal load is large or small.

It is to be noted that while the degree of opening of the valve (5) was subjected to proportional control so that the difference between the detection temperatures of the temperature detectors (8) and (9) may be maintained constant upon use of the high temperature thermostat (22) in the abovedescribed embodiment, it is not alway necessary to maintain a constant temperature difference, but the instructions for start and stop of the compressor (1) and for opening and closing the valve (5) could be issued on the basis of the detection temperature of the temperature detector (8) which detects the temperature of the return air (6), and, upon controlling the cooling capacity of the cooling apparatus, the regulation of the degree of opening of the valve (5) could be effected in such manner that the detection temperature of the temperature detector (9) which detects the temperature of the blow-out air (7) may become lower than the set temperature by a predetermined temperature decrement. If it is aimed merely to suppress local overcooling and temperature fluctuation and limit the repetition frequency of start and stop of the compressor (1), then it is also possible to maintain the degree of opening of the valve (5) at a constant value. Furthermore, in some cases, the control for the cooling capacity is not always necessary, and in such cases the instruction for the valve (5) to open need not be issued.

One example of a temperature control system according to the present invention is shown in a block form in FIG. 3. The operation of the illustrated temperature control system is as follows. That is, a difference between a set temperature and a detected temperature by a temperature detector (8) or (9), which has been calculated by a deviation calculator (16), is transmitted to the comparators (28) to (31), in which the temperature difference is compared with a deviation set in a thermostat (22)-(24) selected by thermostat selecting means (17) to actuate the compressor driving circuit (34), the heater driving circuit (35) and the fan driving circuit (36), and thereby driving of a compressor (1) and a fan (12) as well as current feed to a heater (11) are instructed. On the other hand, calculation for performing preportional control is executed by the calculator (32), the result of calculation is transmitted to the valuve driving circuit (33) to instruct that a valve (5) should be maintained at an appropriate degree of opening. Among these comparators, to the comparator (28) is also transmitted a difference between the detected temperatures by the temperature detectors (8) and (9), which difference has been calculated by the deviation calculator (16), and depending upon a set temperature, either this temperature difference or the above-described temperature deviation from the set temperature is selectively employed.

In addition, while only one of the detection temperatures of the temperatures was always used for temperature control in the above-described embodiment, it is also possible to carry out comparative calculation for the detection temperatures of the temperature detectors (8) and (9), and as a result of the comparative calculation, to use, for example, a higher value, a lower value or an average value of the both values, and it is likely possible to combine this control method with the basic temperature control method which merely employs only one of the detection temperatures.

Also, while an example in which a bypassing flow rate of a hot gas is controlled was illustrated as one example of a method for controlling a cooling capacity of a cooling apparatus in the above-described embodiment, the cooling capacity could be controlled by carrying out control of a flow rate of the circulating refrigerant either by providing a valve between the evaporator (4) and the compressor (1) or by making the restrictor variable, in place of the abovementioned control method, or else, capacity control of the compressor (1) itself may be carried out.

While description was made with respect to an example in which the methods for controlling a temperature in the high temperature region, medium temperature region and low temperature region are different from one another in the above-described embodiment, the temperature control methods in the low temperature region and in the high temperature region, for example, could be made identical.

In addition, while the controllable temperature range was divided into three sections in the above-described embodiment, it could be more finely divided into more than three sections. It is to be noted that the above-described temperature range and temperature regions were given merely by way of example, and they are not limited to the described range and regions.

Furthermore, while a temperature of air within a chamber for accommodating articles was controlled in the above-described embodiment, the present invention should not be limited to such applications, but it is widely applicable to control of a temperature of an object to be cooled or heated by a cooling/heating apparatus.

Since many changes and modifications could be made to the above-described method without departing from the spirit of the present invention, it is intended that all matter contained in the above description and illustrated in the accompanying drawings shall be interpreted to be illustrative and not as a limitation to the scope of the invention.

What is claimed is:

1. A method for controlling a temperature of an object to be cooled or heated by a cooling/heating apparatus to a selected temperature, wherein a controllable temperature range of the object is divided into a least three sections and in the respective temperature sections, the temperature of the object is controlled through methods suitable for the respective temperature sections, the choice of sections being dependent upon the selected temperature;

wherein the controllable temperature range is divided into three sections consisting of a low temperature region, a medium temperature region, and a high temperature region, and wherein in said low temperature region, the temperature of the object is controlled by switching said cooling/heating apparatus ON and OFF, and in said medium temperature region, the temperature of the object is controlled by capacitor control of said cooling/heating apparatus and in said high temperature region, the temperature of the object is controlled by switching said cooling/heating apparatus ON and OFF.

2. A method for controlling a temperature as claimed in claim 1, wherein a temperature of an airflow from the object returning to said cooling/heating apparatus and a temperature of an airflow from the object blowing out of said heating/cooling apparatus are detected, and the temperature of the object is controlled by making use of at least one of the detected temperatures.

3. A method for controlling a temperature as claimed in claim 2, wherein in said low temperature region, the temperature of the object is controlled by switching said cooling/heating apparatus ON and OFF so that the return temperature of the airflow from said object may become constant, and in said medium temperature region, the temperature of the object is controlled by controlling a capacity of said cooling/heating apparatus so that the blow-out temperature of the airflow from said object may become constant, and in said high temperature region, the temperature of the object is controlled by switching said cooling/heating apparatus ON and OFF so that the return temperature of the airflow from said object may become constant while the difference between the return airflow temperature and the blow-out airflow temperature of the object is maintained constant.

4. A method for controlling a temperature of an object to be cooled or heated by cooling/heating apparatus to a selected temperature, wherein a controllable temperature range of the object is divided into at least three sections and in the respective temperature sections, the temperature of the object is controlled through methods suitable for the respective temperature sections, the choice of sections being dependent upon the selected temperature;
   wherein a temperature of an airflow from the object returning to said cooling/heating apparatus and a temperature of an airflow from the object blowing out of said heating/cooling apparatus are detected, and the temperature of the object is controlled by making use of at least of the detected temperatures.

5. A method for controlling a temperature as claimed in claim 4, wherein in said low temperature region, the temperature of the object is controlled by switching said cooling/heating apparatus ON and OFF so that the return temperature of the airflow from said object may become constant, and in said medium temperature region, the temperature of the object is controlled by controlling a capacity of said cooling/heating apparatus so that the blow-out temperature of the airflow from said object may become constant, and in said high temperature region, the temperature of the object is controlled by switching said cooling/heating apparatus ON and OFF so that the return temperature of the airflow from said object may become constant while the difference between the return airflow temperature and the blow-out airflow temperature of the object is maintained constant.

6. A method for controlling a temperature of an object to be cooled or heated by cooling/heating apparatus to a selected temperature, wherein a controllable temperature range of the object is divided into at least three sections and in the respective temperature sections, the temperature of the object is controlled through methods suitable for the respective temperature sections, the choice of sections being dependent upon the selected temperature;
   wherein the controllable temperature range is divided into three sections consisting of a low temperature region, a medium temperature region, and a high temperature region, and wherein in said low temperature region, the temperature of the object is controlled by switching said cooling/heating apparatus ON and OFF, and in said medium temperature region, the temperature of the object is controlled by capacity control of said heating/cooling apparatus, and in said high temperature region, the temperature of the object is controlled by switching said cooling/heating apparatus ON and OFF;
   and wherein a temperature of an airflow from the object returning to said cooling/heating apparatus and a temperature of an airflow from the object blowing out of said heating/cooling apparatus are detected, and the temperature of the object is controlled by making use of at least one of the detected temperatures.

* * * * *